(12) United States Patent
Tamura

(10) Patent No.: US 6,469,811 B1
(45) Date of Patent: Oct. 22, 2002

(54) FEEDER TRAY AND IMAGE PRINTING APPARATUS HAVING FEEDER TRAY

(75) Inventor: Kenya Tamura, Yokohama (JP)

(73) Assignee: Matsushita Graphic Communication Systems, Inc., Tokyo (JP)

(*) Notice: Subject to any disclaimer, the term of this patent is extended or adjusted under 35 U.S.C. 154(b) by 0 days.

(21) Appl. No.: 09/309,260

(22) Filed: May 11, 1999

(30) Foreign Application Priority Data

Oct. 21, 1998 (JP) .......................................... 10-300055

(51) Int. Cl.7 ................................................ H04N 1/04
(52) U.S. Cl. ....................... 358/498; 399/393; 271/145; 358/400
(58) Field of Search ................................ 358/498, 400, 358/496, 497; 399/393; 271/145, 162–164, 223, 311, 171, 9.08, 207

(56) References Cited

U.S. PATENT DOCUMENTS

| | | | |
|---|---|---|---|
| 5,346,197 A | * 9/1994 | Takano et al. | 271/171 |
| 5,454,555 A | * 10/1995 | Kiyohara et al. | 271/145 |
| 5,537,195 A | * 7/1996 | Sagara et al. | 271/171 |
| 5,775,687 A | * 7/1998 | Nakatani et al. | 271/145 |
| 6,040,919 A | * 3/2000 | Iwata et al. | 358/400 |
| 6,070,868 A | * 6/2000 | Nagato et al. | 271/145 |
| 6,264,386 B1 | * 7/2001 | Sugahara | 400/578 |
| 6,308,947 B1 | * 10/2001 | Kojima et al. | 271/124 |

FOREIGN PATENT DOCUMENTS

| | | |
|---|---|---|
| EP | 497602 | 8/1992 |
| JP | 58172130 | 10/1983 |
| JP | 4-313530 | 11/1992 |
| JP | 6-298382 | 10/1994 |
| JP | 9-278261 | 10/1997 |
| JP | 10126544 | 5/1998 |

OTHER PUBLICATIONS

English Language Abstract of JP 6–298382.
English Language Abstract of JP 58–172130.

* cited by examiner

Primary Examiner—Cheukfan Lee
(74) Attorney, Agent, or Firm—Greenblum & Bernstein, P.L.C.

(57) ABSTRACT

A tray body 2 and a movable plate portion 10 can be folded each other. If there is sufficient space in an apparatus setting area, the movable plate portion 10 is opened, and cut paper is support by both a first mounting surface 3a and a second mounting surface 10a. If the apparatus setting area is limited, the movable plate portion 10 is closed and the occupying area of a feeder tray 1 is reduced. In this case, since an insertion port 16 is formed between the first mounting surface 3a and the second mounting surface 10a, paper feeding can be carried out even when the tray body 2 and the movable plate portion 10 are folded.

5 Claims, 8 Drawing Sheets

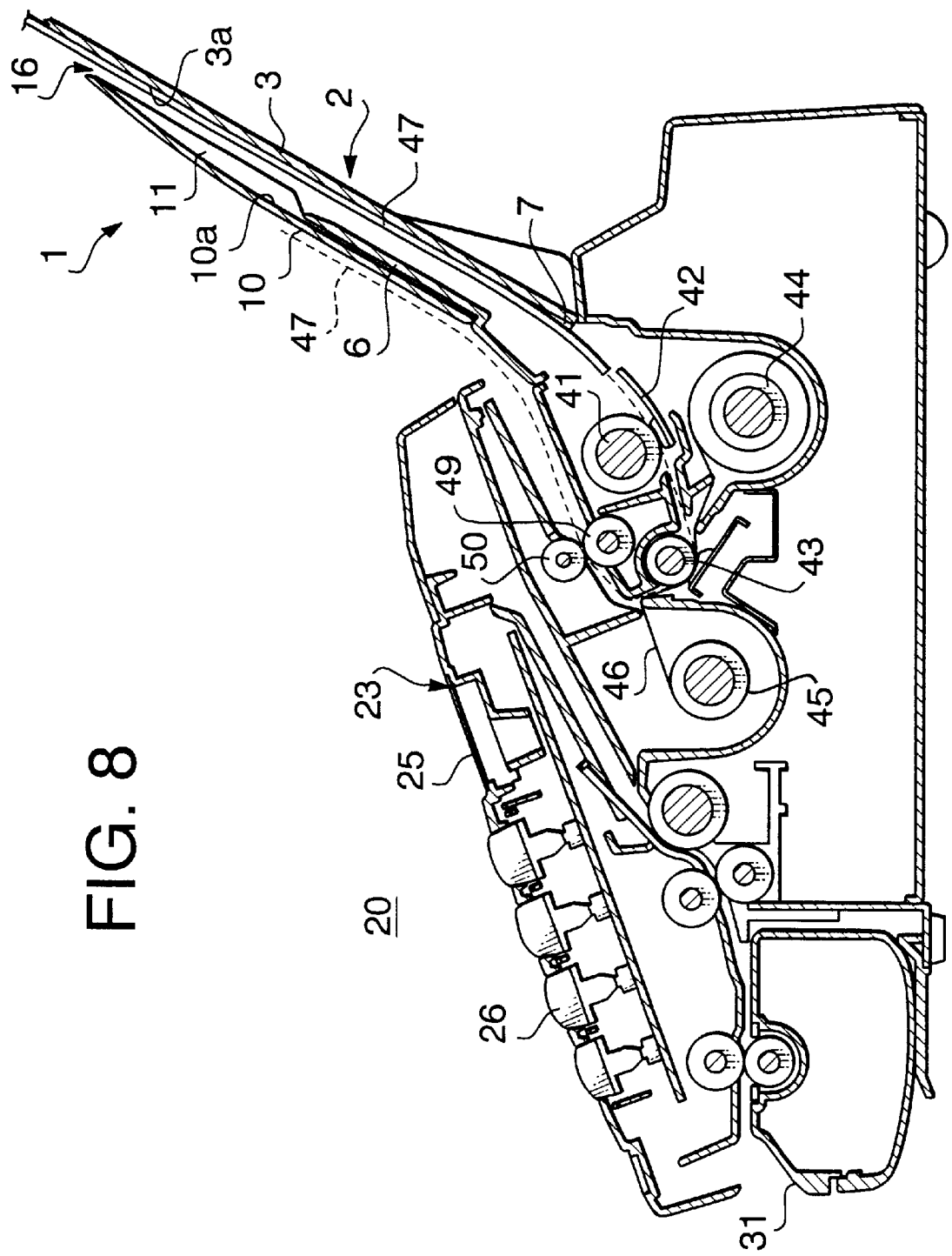

FEEDER TRAY AND IMAGE PRINTING APPARATUS HAVING FEEDER TRAY

BACKGROUND OF THE INVENTION

1. Field of the Invention

The present invention relates to a feeder tray and an image printing apparatus having the feeder tray.

2. Description of the Related Art

In facsimile apparatuses for domestic use, which are the so-called home-facsimile apparatuses, and for use in small-sized office, a thermal printing system using a roll of heat-sensitive paper were conventionally employed in many cases. However, in recent years, a thermal transfer system using plain cut paper (hereinafter referred to as plain paper printing) has been increasingly employed as a mainstream in place of the thermal printing system.

Since the plain paper is cut paper, no curling occurs and a direct writing thereon is possible and no color fade is generated. For these advantages, the plain paper can be stored for a long period of time.

In such a home-facsimile apparatus of a plain paper printing type, compact and lightweight are required. However, the miniaturization and weight reduction of the apparatus make it difficult to have feeder cassette containing plain paper built in the main body of the apparatus. In order to solve the difficulty, there is used the structure in which the feeder tray is attached to the main body of the apparatus to project to the outer section thereof. In this structure, the plain paper mounted on the feeder tray is sent to a printing head and a nip of a printing roller together with an ink film by an auto-sheet feeder (ASF) roller.

Such a conventional feeder tray has a length, which is substantially the same as the length in a longitudinal direction of an A4-sized paper in order to support the plain paper along its entire length. For this reason, the size of the main body of the apparatus is reduced, but an area necessary for setting the entire apparatus extends in back and forth directions of the apparatus than the facsimile using a roll of paper. Then, if the length of the feeder tray is simply reduced to lessen the apparatus setting area, there occurs a case in which paper cannot be smoothly fed.

The present invention has been made in consideration of the above-mentioned problem, an the object of the present invention is to provide a feeder tray, which is capable of reducing an apparatus setting area as maintaining its operability, and to provide an image printing apparatus having such a feeder tray.

SUMMARY OF THE INVENTION

The object of the present invention is that a feeder tray can be folded and that paper feeding can be carried out even in a state that the feeder tray is folded.

The above object can be achieved by a feeder tray comprising:

a tray body having a first mounting surface for supporting a part of cut paper; and a movable plate portion, attached to a back end portion of the tray body in a paper feeding direction to be freely opened and closed, having a second mounting surface for supporting the cut paper in cooperation with the first mounting surface when being opened, and forming an insertion port from which the cut paper can be inserted between the first mounting surface and the second mounting surface when being closed such that the first mounting surface and the second mounting surface are opposite to each other.

According to the aforementioned aspect of the invention, a setting area of the entire image printing apparatus can be reduced as maintaining its operability.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 8 is a view showing a feeding mechanism of the feeder tray and that of the home-facsimile apparatus according to the above embodiment when the feeder tray is closed.

DETAILED DESCRIPTION OF THE PREFERRED EMBODIMENTS

An embodiment of the present invention will now be described with reference to the accompanying drawings.

Figure 1:
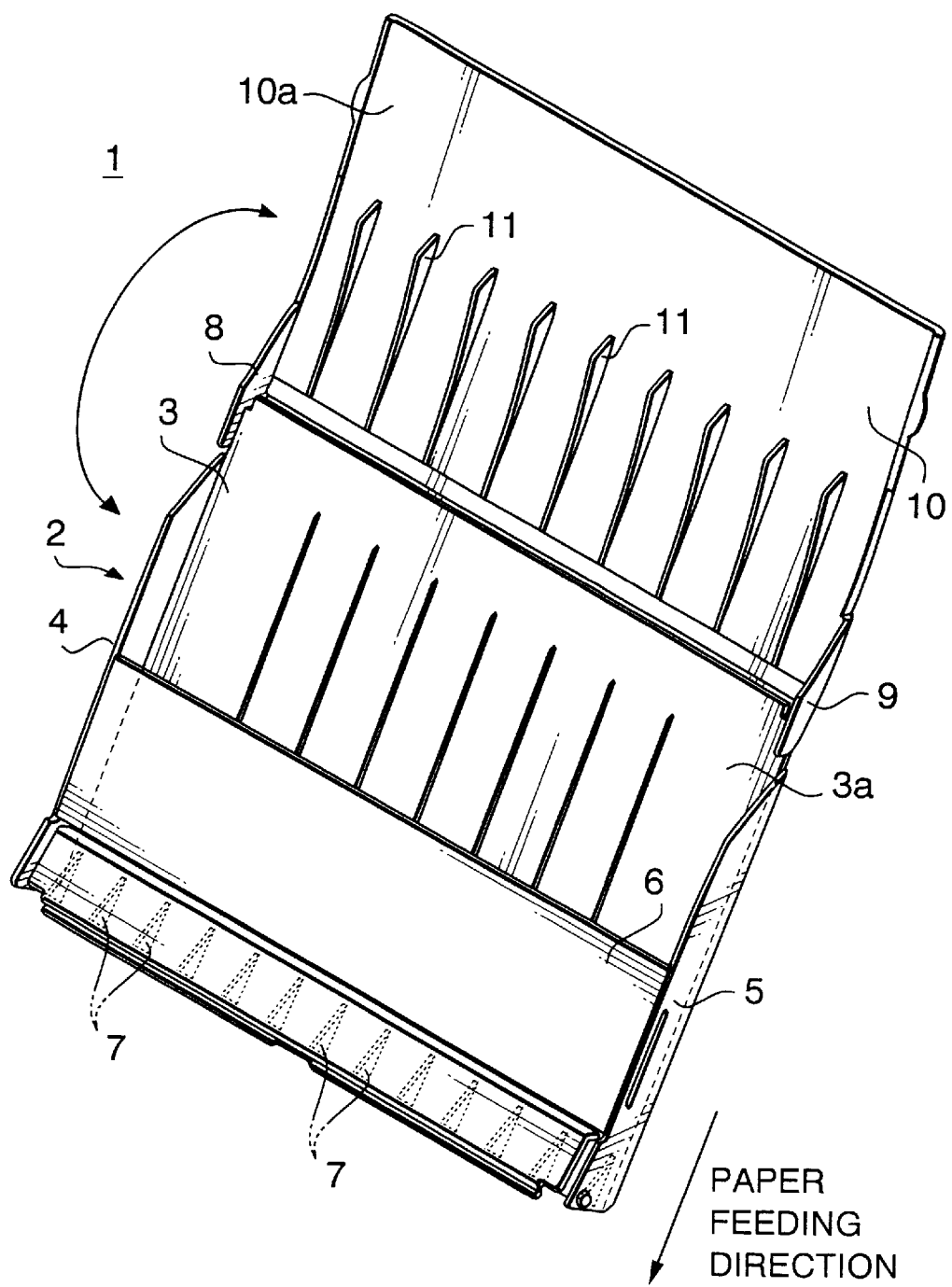
FIG. 1 is a perspective view showing a state in a feeder tray according to one embodiment of the present invention is opened.
Figure 2:
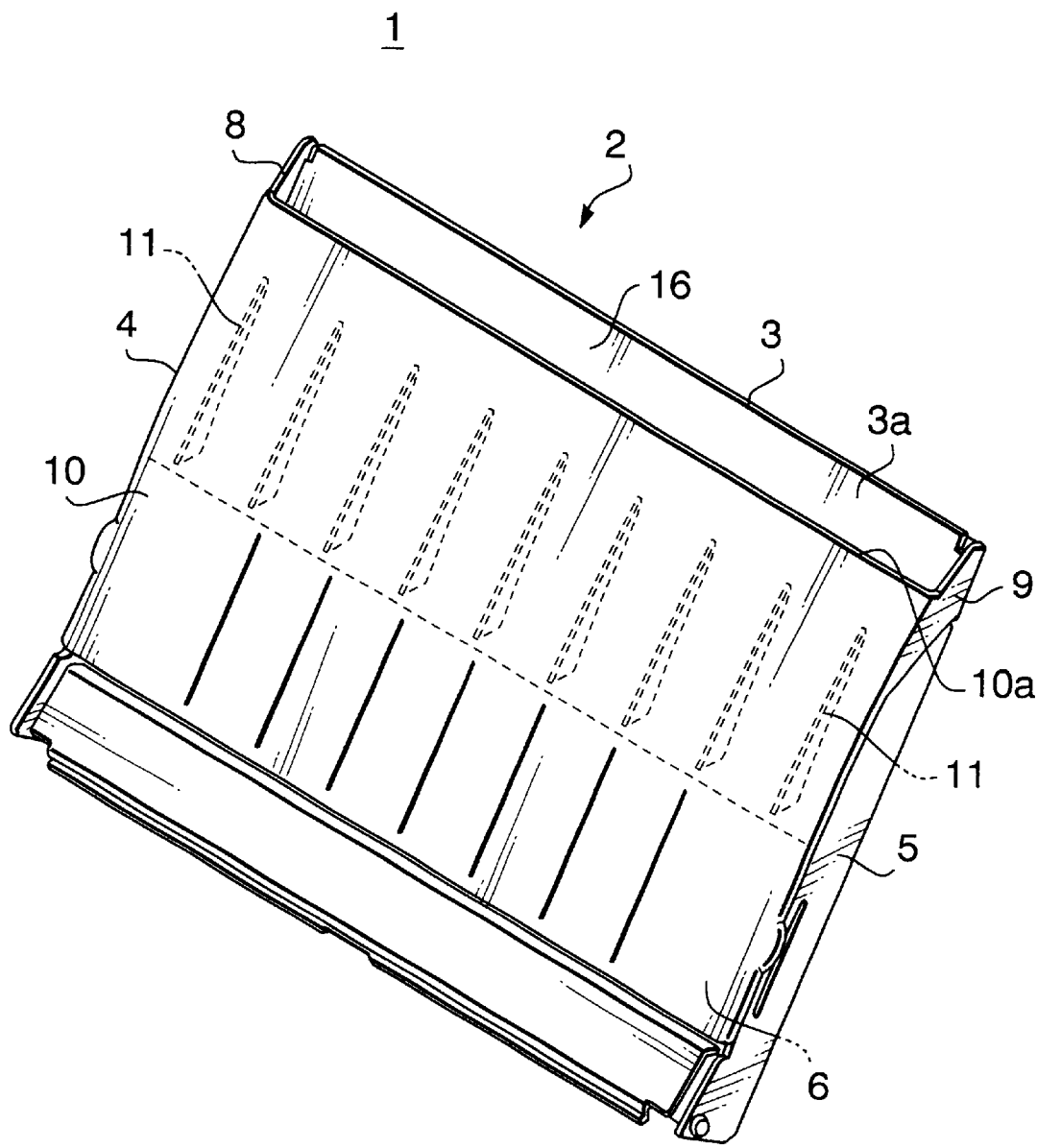
FIG. 2 is a perspective view showing a state in the feeder tray according to the above embodiment is closed.

FIG. 1 is a perspective view showing a state in a feeder tray according to one embodiment of the present invention is opened. FIG. 2 is a perspective view showing a state in the feeder tray according to the above embodiment is closed.

A feeder tray 1 has a tray body 2 attached to the main body of the facsimile apparatus. The tray body 2 has a flat plate portion 3 of a substantially rectangle for defining a first mounting surface 3a for supporting a part of cut paper. A horizontal width of the flat plate portion 3 with respect to a paper feeding direction is slightly shorter than a long side of A4-sized plain cut paper. In this embodiment, the length of the flat plate portion 3 in the paper feeding direction is slightly shorter than about a half of the long side of A4-sized plain cut paper.

Side wall portions 4 and 5 are arranged in a standing condition along both edges of the flat plate portion 3. The side wall portions 4 and 5 support both end portions of a cover portion 6. The cover portion 6 is placed with a fixed distance to be opposite to the fist mounting surface 3a. The cover portion 6 covers about one-third of the first mounting surface 3a from a front end portion of the flat plate 3 in the paper feeding direction to a back end portion thereof. Moreover, guide projections 7. which guides the cut paper into the main body of the facsimile apparatus, are arranged at the front end portion of the flat plate portion 3 along a paper feeding direction.

A movable plate portion 10 is rotatably attached to both side surface portions of the back end side of the flat plate portion 3 in the paper feeding direction through hinges 9 and 10. The movable plate portion 10 is a plate of substantially a rectangle, and the horizontal width with respect to the paper feeding direction is slightly larger than the short side of the A4-sized plain paper. Also, the length of the movable plate portion 10 in the paper feeding direction is shorter than the long side of the A4-sized plain paper. In this embodiment, the length of the movable plate portion 10 in the paper feeding direction is about one-third of the long side of the A4-sized plain paper. On a main surface 10a (hereinafter referred to as second mounting surface) of the movable plate portion 10, a plurality of guide projections 11 is arranged along the paper feeding direction.

Figure 3:
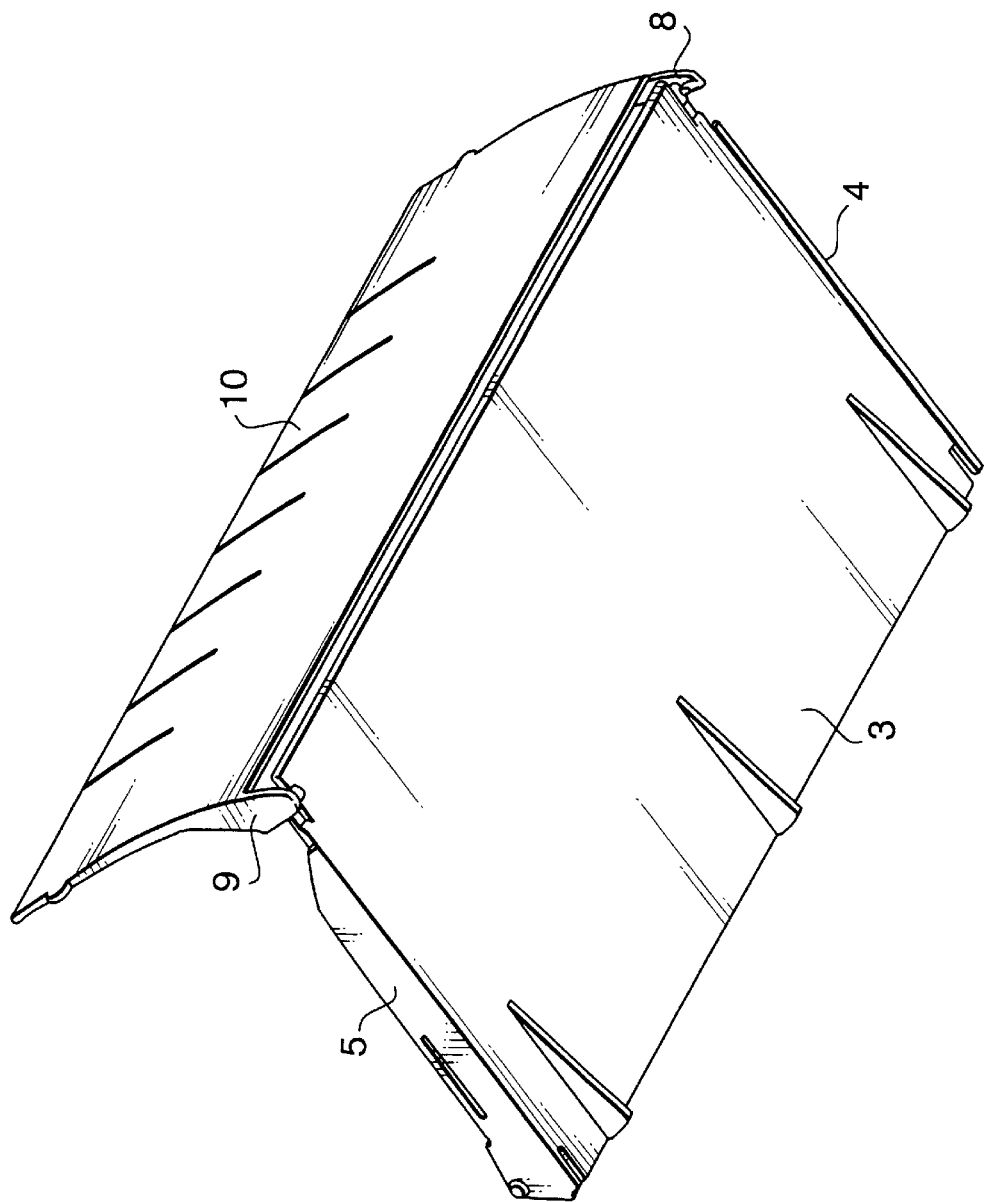
FIG. 3 is a perspective view showing a state in which a feeder cover according to the above embodiment is seen from a back surface side.
Figure 4:
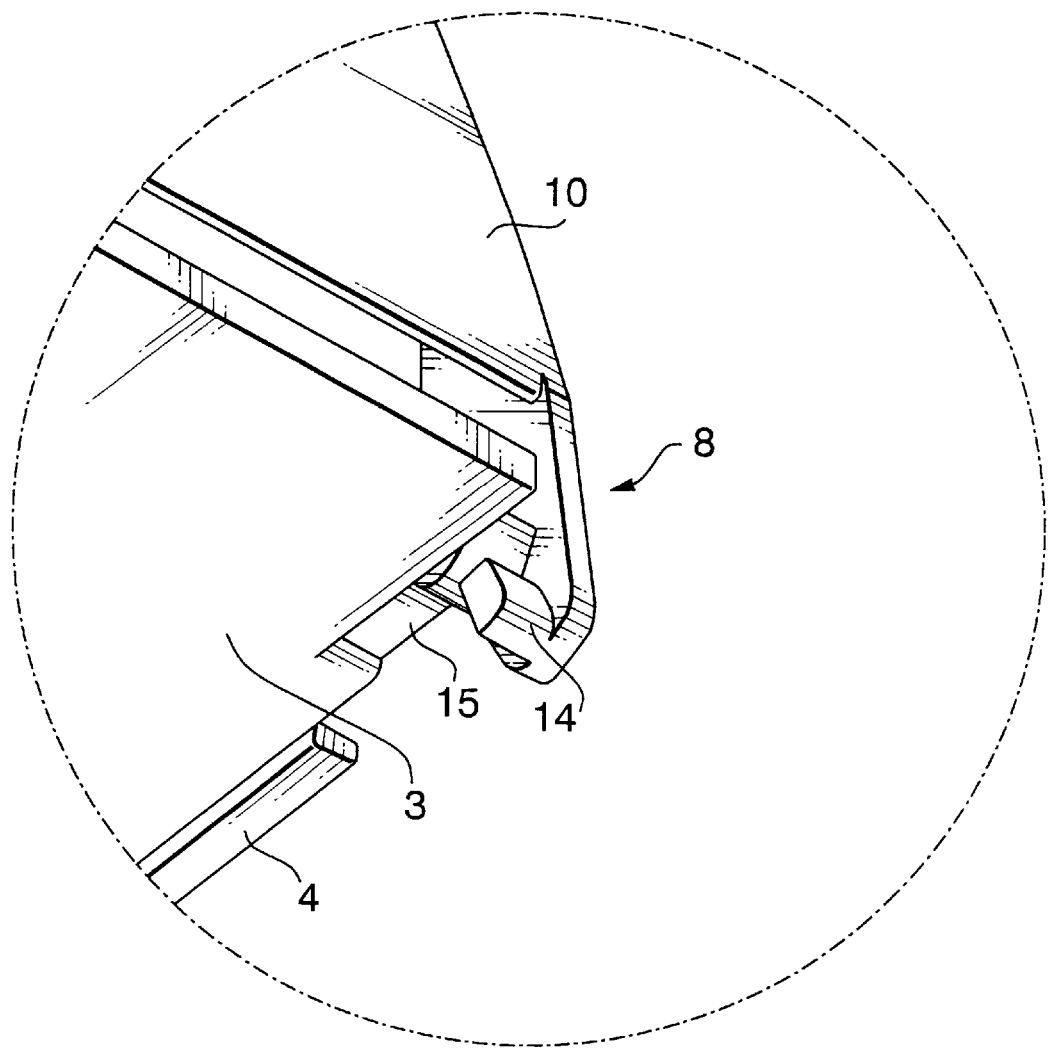
FIG. 4 is an enlarged perspective view showing a hinge of the feeder cover according to the above embodiment.
Figure 5:
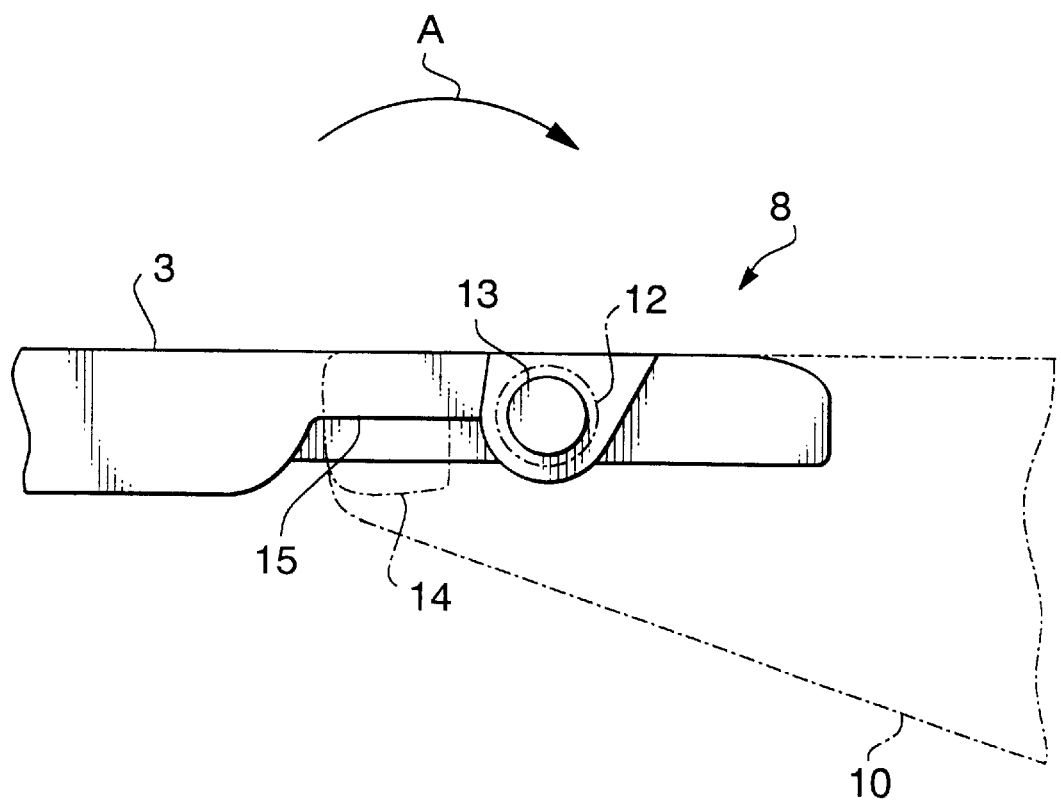
FIG. 5 is a partially perspective side view showing the hinge of the feeder cover according to the above embodiment.

FIG. 3 is a perspective view showing a state in which a feeder cover according to the above embodiment is seen from a back surface side. FIG. 4 is an enlarged perspective view showing a hinge of the feeder cover according to the above embodiment. FIG. 5 is a partially perspective side view showing the hinge of the feeder cover according to the above embodiment. The hinges 8 and 9 are formed on both end portions of the front-end side of the movable plate portion 10 in the paper feeding direction. The hinges 8 and 9 rise from the second mounting surface 10a and project to the front in the paper feeding direction. A depression 12 and a protrusion 13 are formed on an inner surface side of each of the hinges 8 and 9. The depression 12 and the protrusion 13 are mounted to swing on the protrusion 13 formed on both side surface portions of the back end side of the flat plate portion 3. As a result, the movable plate portion 10 is supported by the depression 12 and the protrusion 13 so that the plate portion 10 can rotate.

In each of the hinges 8 and 9, an engaging portion 14 is placed at the forward portion than the depression 12 and the protrusion 13 to protrude from the hinge to the inner portion. If the movable plate portion 10 is rotated in a direction of an arrow A of FIG. 5, that is, the direction where the movable plate portion 10 is opened, the engaging portion 14 is engaged with an engaging surface 15, which is both side surface portions of the flat plate portion 3 and formed toward the back side. Since this restricts the rotation of the movable plate portion 10 in the direction of arrow A, the movable plate portion 10 stops-in a state in which the first mounting surface 3a and the second mounting surface 10a are substantially parallel to each other.

By the aforementioned structure, the feeder tray 1 according to this embodiment can be folded. In other words, the movable plate portion 10 rotates about the hinges 8 and 9 serving as axes. A user rotates the movable plate portion 10 in the direction of arrow A of FIG. 5 until the engaging portion 14 and the engaging surface 15 are engaged with other. As a result, as shown in FIG. 1, since the first mounting surface 3a and the second mounting surface 10a are substantially parallel to each other, the mounting surfaces can substantially support A4-sized plain cut paper along its entire length.

On the other hand, the movable plate portion 10 is rotated in an opposite direction, and the first mounting surface 3a and the second mounting surface 10a are superimposed on each other to be opposed to each other as shown in FIG. 2. As this time, an insertion port 16 is formed at the back end portion in the paper feeding direction. The insertion port 16 allows cut paper to be inserted between the first mounting surface 3a and the second mounting surface 10a.

Figure 6:
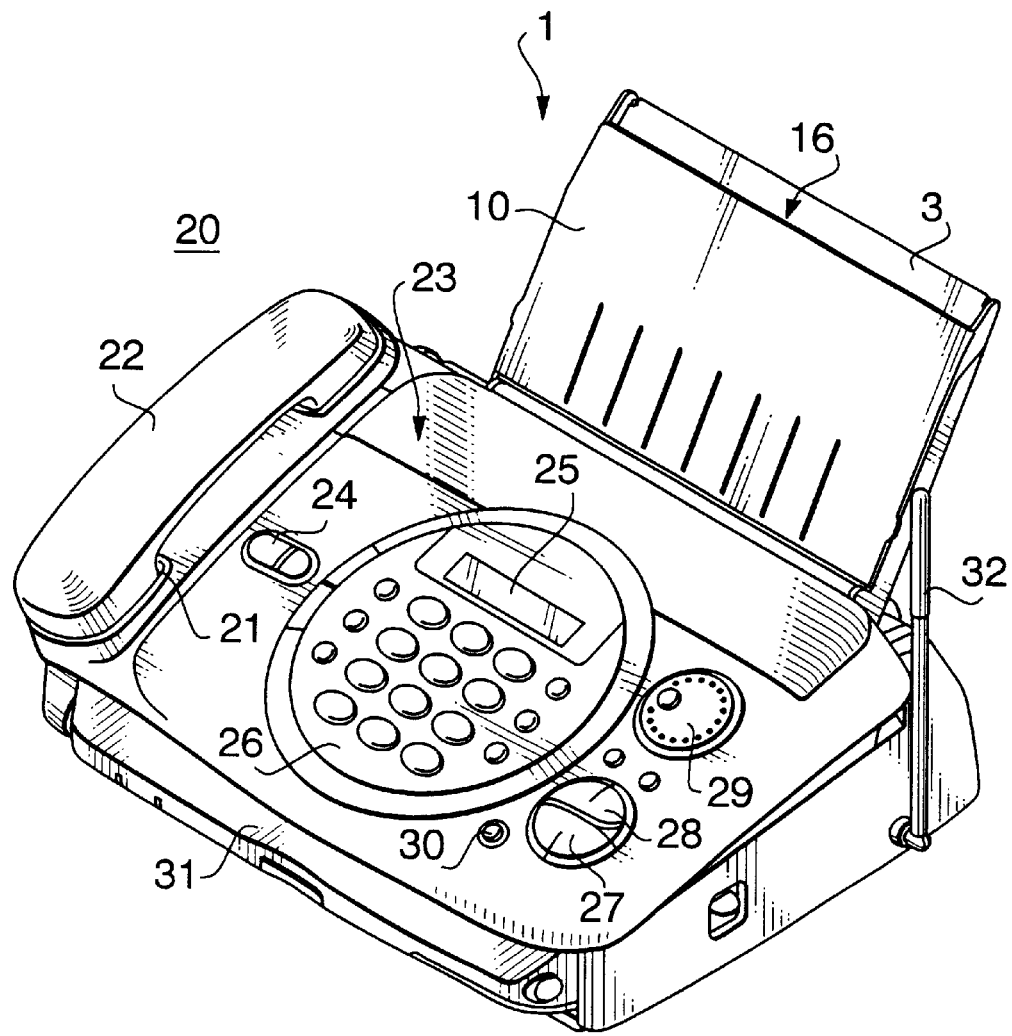
FIG. 6 is a perspective view showing a home-facsimile apparatus (facsimile apparatus for domestic use) to which the feeder tray according to the above embodiment is attached in the closed state.
Figure 7:
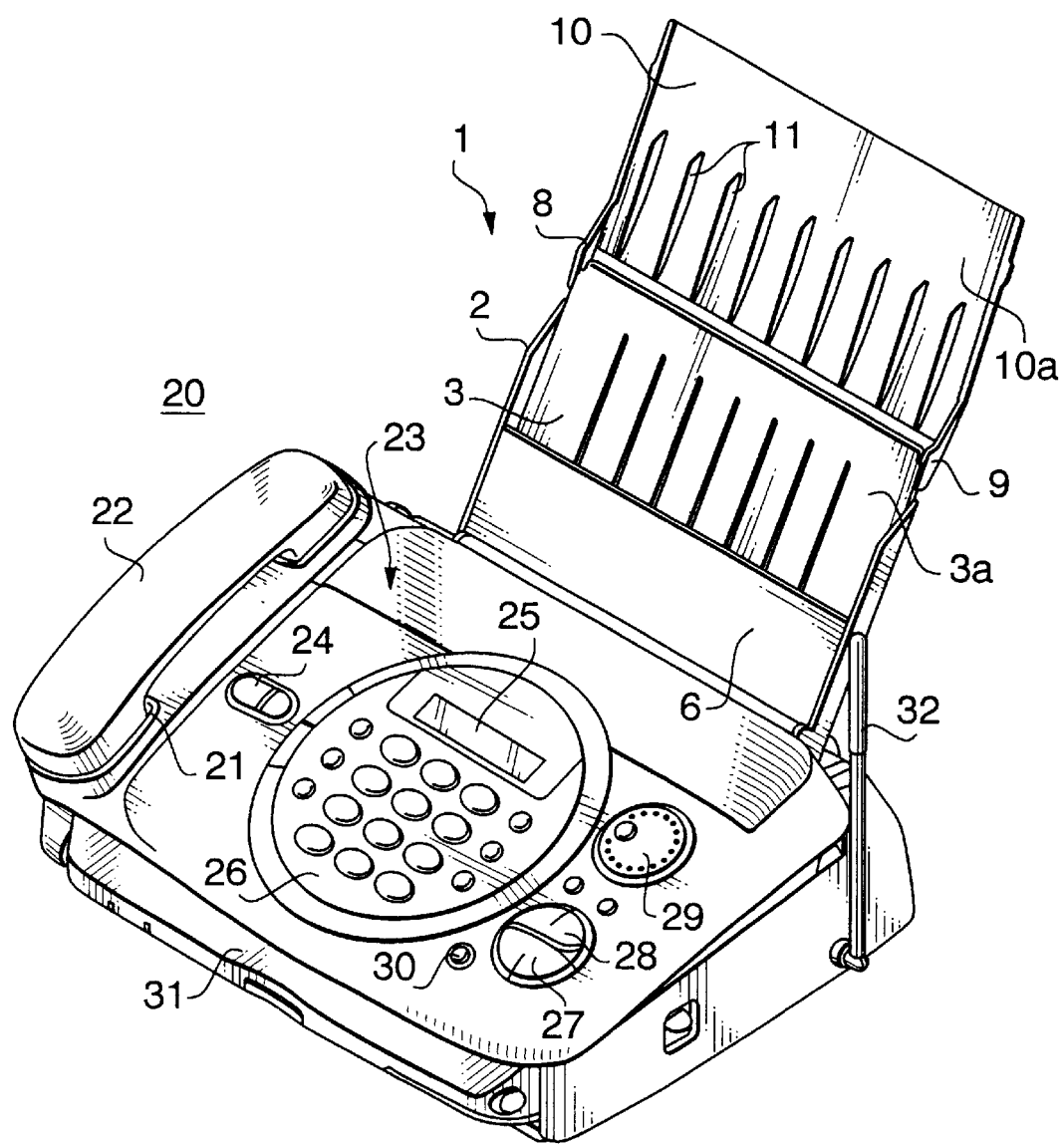
FIG. 7 is a perspective view showing a home-facsimile apparatus to which the feeder tray according to the above embodiment is attached in the opened state.

FIG. 6 is a perspective view showing a home-facsimile apparatus (facsimile apparatus for domestic use) to which the feeder tray according to the above embodiment is attached in the closed state. FIG. 7 is a perspective view showing a home-facsimile apparatus to which the feeder tray according to the above embodiment is attached in the opened state.

A home-facsimile apparatus 20 has a facsimile unit built-in. The facsimile unit outputs data transmitted. Also, the facsimile unit scans an original, and transmits it as data. The facsimile unit also has a main surface inclined by a predetermined angle from a horizontal surface.

A handset cradle portion 21 is provided on the left of the main surface of the home-facsimile apparatus 20. On the handset cradle portion 21, there is formed a cavity to the extent that a speaker portion of the handset 22 can be mounted. A control panel 23 is formed from the center of the main surface of the home-facsimile apparatus 20 to the right.

The control panel 23 has various buttons and dials for operating the home-facsimile apparatus 20. For example, there are arranged a telephone message recorder button 24 for recording and reproducing a telephone message, a display 25 for displaying various data such as a telephone number, a name, etc., a numeric keypad 26 for inputting a telephone number, figures, a copy button 27 for instructing the copy of an original document, a start button 28 for starting transmission, a scroll dial 29 for scrolling a telephone number registered in advance, and a stop button 30 for stopping the operation.

A scanner 31 for scanning the image of the document is attached to the front side portion of the home-facsimile apparatus 20. The scanner 31 is provided to be detachable from the home-facsimile apparatus 20. Namely, the scanner 31 can be used as a handy scanner by being detaching from the home-facsimile apparatus 20. An antenna 32 is rotatably fixed onto the side portion of the home-facsimile apparatus 20.

The feeder tray 1 is attached to the backside portion of the home-facsimile apparatus 20. More specifically, the feeder tray 1 is rotatably attached to an entrance of an original document supply port formed at the backside portion of the home-facsimile apparatus 20. A support portion that supports the feeder tray 1 is provided in the vicinity of the original support port. The rotation of the feeder tray 1 is stopped at a position where the direction of the first mounting surface 3a forms a predetermined angle with the horizontal surface.

In the above-explained home-facsimile apparatus 20, the feeder tray 1 is structured such that the tray body 2 and the movable plate portion 10 can be folded each other. For this reason, if there is sufficient space in an apparatus setting area, the movable plate portion 10 is opened as shown in FIG. 7, and the cut paper is supported by both the first mounting surface 3a and the second mounting surface 10a.

On the other hand, if the apparatus setting area is limited, the movable plate portion 10 is closed as shown in FIG. 6, and the occupying area of the feeder tray 1 is reduced. At this time, paper feeding can be carried out since the insertion port 16 is formed between the first mounting surface 3a and the second mounting surface 10a. Therefore, both the reduction in the apparatus setting area and the maintenance of operability can be established.

Moreover, the guide projections 11 are arranged on the second mounting surface 10a of the movable plate portion 10. As shown in FIG. 7, when the movable plate portion 10 is opened, the guide projections 11 mount the cut paper thereon along the first mounting surface 3a and the second mounting surface 10a, and a contact area between the cut paper and the movable plate portion 10 can be reduced at a paper feeding time. As a result, since frictional resistance that acts on a portion between the cut paper and the home-facsimile apparatus 20 can be lessened, the cut paper can be smoothly fed to the home-facsimile apparatus 20.

On the other hand, as shown in FIG. 6, when the movable plate portion 10 is closed, the guide projections 11 guide the cut paper to a paper-feeding destination. FIG. 8 is a view showing a feeding mechanism of the feeder tray and that of the home-facsimile apparatus according to the above embodiment when the feeder tray is closed.

In the home-facsimile apparatus 20, an ASF roller 41 is provided at the paper-feeding destination from the feeder tray 1. A separation pad 42 is provided in the vicinity of the ASF roller 41. A printing roller 43 is provided at the paper-feeding destination of the ASF roller 41. The printing roller 43 presses cut paper 47 onto a printing head 48 together with an ink film 46 taken up from an ink film roller 44 by a take-up roller 45. A paper-discharging roller 49 is provided at the paper-feeding destination of the printing roller 43, and a pinch roller 50 is also provided to be opposite to the paper-discharging roller 49.

The cut paper 47 is inserted from the portion 16 in the state that the movable plate portion 10 is closed. The guide projections guide the cut paper 47 to guide projections 7 formed at the front-end portion of the tray body 2 in the paper feeding direction. Then, the cut paper 47 is introduced between the ASF roller 41 and the nip of the separation pad 42. Therefore, the cut paper 47 can be prevented from entering a space between the cover portion 6 and the second mounting surface 10a.

The guide projections 11 thus perform the function of feeding the cut paper smoothly in both cases in which the movable plate portion 10 is opened and closed.

Moreover, the cover portion 6 is formed to be opposite to the front end side portion of the first mounting surface 3a of the tray body 2 in the paper feeding direction and to have a fixed distance. For this reason, dust, etc., can be prevented from entering the interior of the home-facsimile apparatus 20 when the movable plate portion 10 is opened as shown in FIG. 7.

The present invention is not limited to the above-explained embodiment. For example, the feeder tray of the present invention can be widely applied to an image printing apparatus using cut paper such as a printer, a copy machine other than the home-facsimile apparatus.

As explained above, according to the present invention, in the image printing apparatus, the apparatus setting area can be reduced as maintaining its operability.

The present invention is not limited to the above-described embodiment, and various variations and modifications may be possible without departing from the scope of the present invention.

This application is based on the Japanese Patent Application No. Hei 10-300055 filed on Oct. 21, 1998, entire content of which is expressly incorporated by reference herein.

What is claimed is:

1. A feeder tray comprising:

a tray body having a first mounting surface for supporting a part of cut paper; and a movable plate portion, attached to a back end portion of said tray body in a paper feeding direction to be freely opened and closed, having a second mounting surface for supporting said cut paper in cooperation with said first mounting surface when being opened, and forming an insertion port from which said cut paper can be inserted between said first mounting surface and said second mounting surface when being closed such that said first mounting surface and said second mounting surface are opposite to each other.

2. The feeder tray according to claim 1, wherein said movable plate portion having a plurality of projections arranged on said second mounting surface along a longitudinal direction of the cut paper, and said projections guide said cut paper to a paper-feeding destination when said movable plate portion is closed.

3. The feeder tray according to claim 1, wherein said tray body has a cover for covering the cut paper mounted on said first mounting surface on at least its front end portion in the paper feeding direction.

4. An image recording apparatus comprising:

an apparatus main body having an image printing section; and a feeder tray described in claim 1 attached to said apparatus main body.

5. A facsimile apparatus comprising:

a feeder tray described in claim 1;

receiving means for receiving image data from a communication destination; and image printing means for printing said received image data on a printing paper fed from said feeder tray.

* * * * *